June 1, 1971　　　A. J. DUFFIELD　　　3,581,329
PIERCE AND TAP DRIVER PIN FOR POWER-ACTUATED TOOL
Filed May 29, 1968
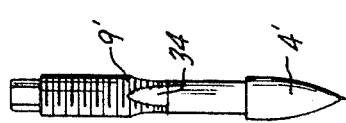
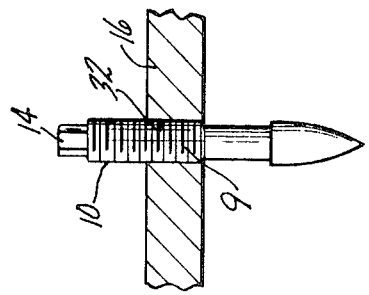
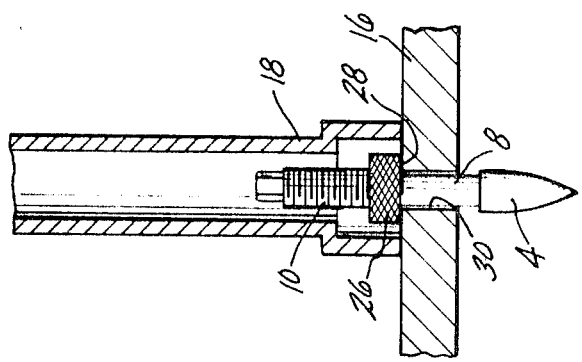
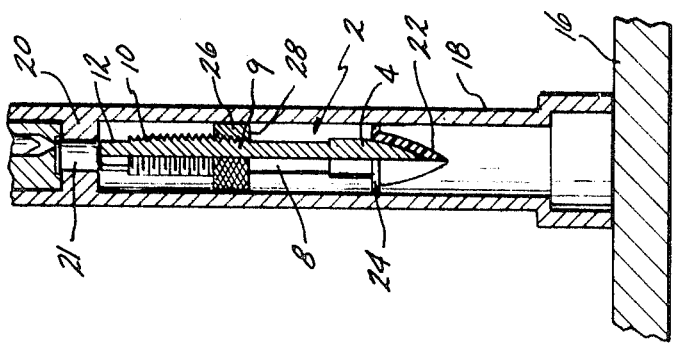
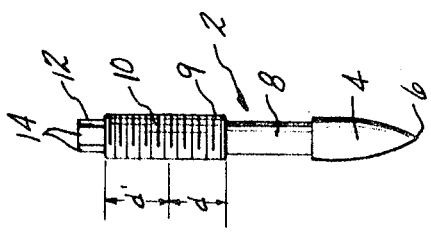
INVENTOR
ALBERT J. DUFFIELD
BY William W. Jones
ATTORNEY United States Patent Office 3,581,329
Patented June 1, 1971

3,581,329
PIERCE AND TAP DRIVER PIN FOR
POWER-ACTUATED TOOL
Albert J. Duffield, Woodbridge, Conn., assignor to
Olin Corporation
Filed May 29, 1968, Ser. No. 733,089
Int. Cl. B23g 5/20, 7/00
U.S. Cl. 10—140                                6 Claims

ABSTRACT OF THE DISCLOSURE

For use with a power-actuated tool, a pin for piercing and tapping an aperture, which pin comprises piercing means formed at the forward end of the pin and thread tapping means formed rearwardly on the pin with an undercut portion disposed between the piercing and thread tapping means.

This invention relates to a pin for forming a threaded aperture in a member, such as a metal plate, or the like, which pin is specifically adapted for use with a power-actuated tool. As used in this specification, the phrase "power-actuated tool" refers to a tool used for driving fasteners, studs, and the like, which tool obtains its power from an explosive charge. U.S. patents, Nos. 3,066,302 to Charles De Caro et al., and 2,968,811 to Robert W. Henning et al. disclose typical examples of the types of power-actuated tools which may be used in conjunction with the pin of this invention.

It is well known to form a device which both pierces a surface and taps a thread in the aperture thus formed. Self-tapping screws are primary examples of the conventional piercing and tapping devices of the prior art.

The power-actuated tool has found extensive application in the modern construction industry due to its portability, efficiency, and rapidity of use. A variety of fasteners have been developed in the prior art for specific use with power-actuated tools. Such fasteners range from simple studs to pins having a rearward threaded portion which protrudes from the member into which the pin is driven, which threaded portion provides means whereby another member can be threadedly attached to the supporting member.

While, as noted above, combined piercing and thread tapping implements are generally known and used in the construction industry, no such implement has been developed specifically for use with a power-actuated tool. Moreover, the fasteners which have been developed for use with power-actuated tools have proven incapable of tapping a thread after being driven into a supporting member.

The pin of this invention is specifically adapted for use with a power-actuated tool for piercing and threading an aperture in a supporting member, such as a steel plate, or the like. In order to accomplish this result, the pin of this invention is formed from a cylindrical body for increased strength, and is provided with a forward pointed end which, when driven into the supporting member, serves to pierce the latter to form an aperture therein. The piercing end of the pin of this invention includes a shoulder portion which is driven through the supporting member to determine the size of the aperture therein. That portion of the pin immediately to the rear of the shoulder is undercut to provide an area of reduced diameter which permits the pin to be rotated in the aperture formed in the supporting member. A thread tap is formed on the pin rearward of the undercut portion, which tap is operable to form a thread on the wall of the aperture. The thread tap may be of the cutting variety, or it may be a rolled chipless tap. When the thread tap is of the cutting type, the piercing shoulder is preferably of a diameter which is less than or equal to the minor diameter of the tap. In contrast, when the thread tap is of the chipless rolled variety, the piercing shoulder should have a diameter which is slightly larger than the minor diameter of the tap. The latter is preferred for a chipless tap to facilitate the tapping operation since the chipless tap deforms the aperture wall to form the thread, with the metal in the aperture wall actually flowing down into the valleys on the tap.

A conventionally threaded portion may be disposed on the pin immediately rearwardly of the tap, the threaded portion providing a threaded lug which may be screwed into the tapped aperture to protrude therefrom for further use. The rearward end of the pin preferably includes means for engaging a tool, such as a wrench or screw driver so that the pin can be rotated in the aperture to tap the threads therein. Such tool-engaging means may take the form of ground flats, a slot, or any other conventional modification.

The pin of this invention is preferably provided with a removable drive bushing which is screwed onto the tap portion of the pin. The bushing provides means for stopping the pin at the forward end of the tap when the pin is driven into a supporting member. The tap is thus protected against damage which might otherwise occur when the pin is driven into the supporting member. After driving, the bushing is unscrewed from the tap to expose the latter for tapping the aperture.

It is, therefore, an object of this invention to provide a pin for use with a power-actuated tool which pin includes a portion for piercing a supporting member and a portion for tapping a thread on the wall of an aperture thus formed in the supporting member.

It is a further object of this invention to provide a pin of the character described having an area of reduced diameter interposed between the piercing and tapping portions to permit rotation of the driven pin.

Other objects, features, and advantages of this invention will become readily apparent to those skilled in the art from the following detailed description when read in conjunction with the accompanying drawings in which:

FIG. 1 is a side elevated view of a preferred embodiment of the pin of this invention;

FIG. 2 is a side sectional view of the barrel portion of a power-actuated tool showing the pin of FIG. 1 mounted therein for firing into a supporting member;

FIG. 3 is a side sectional view similar to FIG. 2, but showing the pin after the latter has been driven into the supporting member;

FIG. 4 is a side view partially in section of the supporting member showing the pin of FIG. 1 after the aperture in the supporting member has been threaded; and FIG. 5 is a side elevated view of another form of the pin of this invention which includes a tap of the cutting variety.

Referring now to FIG. 1, a preferred embodiment of the pin of this invention is shown. The pin, indicated generally by the numeral 2, is of a generally cylindrical shape and includes a forward end portion having a pointed tip 6 and a shoulder 4. The tip 6 is operative to pierce a supporting member and the shoulder controls the size of the aperture formed in the supporting member. An intermediate portion 8 of reduced diameter is disposed rearwardly adjacent of the shoulder 4, the undercut portion 8 providing for clearance between the pin 2 and the wall of an aperture formed by the shoulder 4 when the pin is driven into a supporting member. Such clearance is essential to the operation of the pin in that it permits the pin to be rotated in the aperture, as will hereinafter be explained in further detail. A tap 9 is disposed rearwardly of the undercut portion 8. The tap 9 extends for a predetermined distance (*d*) along the pin, the tap 9 shown being of the chipless, rolled, thread variety. The distance (*d*) may be varied, with its dimension being determined by the characteristics, such as hardness, thickness, etc., of the supporting member into which the pin is to be driven. A conventionally threaded portion 10 is disposed to the rear of the tap 9 to extend therefrom for a predetermined distance (*d'*). The threaded portion 10 may be omitted from the pin 2 without departing from the spirit of this invention. The rearward terminal end 12 of the pin 2 is provided with a plurality of longitudinally extending flats 14 defining a polygon for engagement with a tool, such as a tapping wrench, or the like. It is to be noted that other of a variety of tool-engaging means may be formed on the rearward end 12 of the pin without departing from the spirit of this invention. The flats 14 provide means whereby the pin 2 may be engaged by a wrench and rotated after the pin has been initially driven into a supporting member.

Referring now to FIG. 2, the pin 2 is mounted in a power-actuated tool (only partially shown) for driving into a supporting member 16, which is shown as being a steel plate. The pin 2 is disposed in the barrel 18 of the tool with the rearward terminal end 12 of the pin being adjacent to a firing chamber 20 of the tool. While the tool is shown as being a free flight tool, it is to be understood that a piston-type tool can also be used to drive the pin of this invention. A propellant cartridge 21 is seated in the firing chamber 20 rearwardly of the pin terminal 12. The piercing end 4 of the pin is fitted with a plastic cap 22 having a laterally extending flange 24 for centering and frictionally retaining the pin in the barrel 18. An internally threaded bushing 26 is threaded onto the tapping portion 9 of the pin so that a forward face 28 of the bushing 26 is immediately adjacent to the undercut portion 8 of the pin. It is noted that when the pin 2 is driven into the supporting member 16, the plastic cap 22 is shattered by the resulting impacts and thus affords no impediment to the piercing or tapping operations.

As shown in FIG. 3, the pin 2 has been driven into the supporting member 16 by firing the tool, with the shoulder 4 of the pin passing completely through the member 16 to form an aperture 30 therein. The forward face of the bushing 26 is driven against the surface of the supporting member 16 thus preventing the tap 9 from being damaged by contact with the member 16 as the pin is driven. The undercut portion 8 of the pin is disposed within the confines of the aperture 30 thus permitting rotation of the pin 2 in the aperture 30.

After the pin has been driven as shown in FIG. 3, the tool is withdrawn and the bushing 26 is removed from the tap 9. A tapping wrench (not shown) is then applied to the flats 14 and the pin is rotated. In this manner, the tap 9 is driven into the aperture 30 to form a thread 32 on the wall thereof, as shown in FIG. 4. After the thread 32 has been formed, the pin may be screwed into and through the supporting member 16 and re-used to pierce and tap another aperture. Alternatively, the pin may be left in the supporting member 16, as shown in FIG. 4, with the threaded portion 10 providing a fastener onto which some additional element can be screwed.

FIG. 5 shows a pin similar to the pin of FIG. 1, but with a tap 9' of the cutting variety thereon. The tap 9' includes a plurality of longitudinal flats 34 forming cutting edges.

It is noted that when a rolled thread tap such as is shown in FIG. 1 is used, the shoulder 4 should preferably have a diameter which is slightly larger than the minor diameter of the tap 9, and when a cutting tap, such as is shown in FIG. 5, is used, the shoulder 4' should have a diameter which is slightly smaller than the minor diameter of the tap.

As disclosed above, the pin of this invention may be fabricated for repeated piercing and tapping operations, in which case the pin should preferably be of a steel having a hardness of, for example, 60–63 on the Rockwell C scale. When the pin of this invention is intended for a one shot use, the hardness need only be in the range of, for example, 50–55 on the Rockwell C scale.

Thus it is readily apparent that this invention provides a compact, inexpensive means for forming a threaded aperture in a supporting member, which means is specifically designed for use with a power-actuated tool. Furthermore, the pin of this invention may be re-used repeatedly for forming a number of threaded apertures, or may be retained in the threaded aperture formed to serve as a threaded fastener with which additional structural elements can be fastened to the supporting member. The pin of this invention includes internal piercing and tapping portions separated by an integral undercut portion which permits the pin to be rotated after being initially driven into a supporting member.

All of the various portions are coaxial and generally cylindrical to provide the compactness and strength needed for use with a power-actuated tool. Still further, the pin of this invention may be used with a protective bushing removably threaded onto the tapping portion to protect the latter during the piercing operation, and to provide a positive stop regulating the depth to which the pin is initially driven.

Although preferred embodiments of this invention have been specifically illustrated and described herein, it is to be understood that other modifications may be made therein without departing from the scope and spirit of the invention, as defined by the appended claims.

What is claimed is:

1. A cylindrical pin for use with a power-actuated tool in piercing and tapping an aperture in a supporting member, said pin comprising:
   (a) a forward pointed end portion for piercing the supporting member to form an aperture therein, said forward end portion having a first predetermined diameter;
   (b) an intermediate portion rearwardly adjacent to said forward end portion and coaxial therewith, said intermediate portion having a diameter which is less than said first predetermined diameter;
   (c) a thread tap rearwardly adjacent to said intermediate portion and coaxial therewith;
   (d) a threaded portion rearwardly adjacent to said thread tap and coaxial therewith; and
   (e) a plurality of longitudinally extending flats rearward of said threaded portion, said flats defining a polygon means for engagement with a tool, and said polygon means being sized so as to pass freely through an aperture having threads conforming to the threads on said threaded portion.

2. The pin of claim 1 in combination with a threaded bushing means screwed onto said thread tap, said bushing means having a forward laterally extending face disposed forward of a first thread on said thread tap to protect said thread tap from incurring impact damage when said pin is driven into a supporting surface.

3. A pin for use with a power-actuated tool in piercing and tapping an aperture in a supporting member, said pin comprising:
   (a) a forward end portion having a pointed terminal for piercing the supporting member to form an opening therein;
   (b) an undercut portion rearward of said forward end portion;
   (c) thread forming means rearward of said undercut portion; and
   (d) bushing means screwed onto said thread forming means, said bushing means having a forward laterally extending face positioned forward of a first thread on said thread forming means to protect said thread forming means from incurring impact damage when said pin is driven into a supporting surface.

4. The pin of claim 1, wherein said thread tap means is a rolled thread having a minor thread diameter which is smaller than said forward end portion.

5. The pin of claim 1, wherein said thread tap means is a cutting tap having a minor thread diameter which is greater than said forward end portion.

6. A pin for use with a power-actuated tool in piercing and tapping an aperture in a supporting member, said pin comprising;
   (a) a forward end portion having a pointed terminal for piercing the supporting member to form an aperture therein;
   (b) an undercut portion rearward of said forward end portion;
   (c) thread tapping means rearward of said undercut portion;
   (d) tool engaging means rearward of said thread tapping means, said tool engaging means being operative to freely pass through an aperture having threads conforming to the threads on said thread tapping means; and
   (e) bushing means mounted on said thread tapping means, said bushing means having a forward laterally extending face disposed immediately rearward of said undercut portion.

References Cited

UNITED STATES PATENTS

| | | | |
|---|---|---|---|
| 1,475,561 | 11/1923 | Bath et al. | 10—140 |
| 2,694,328 | 11/1954 | La Freniere | 10—140 |
| 2,735,116 | 2/1956 | Mueller | 10—140 |
| 1,984,117 | 12/1934 | Davis | 227—8 |
| 2,053,918 | 9/1936 | Peretzman | 10—140 |
| 2,300,310 | 10/1942 | Poeton | 10—140 |
| 2,499,227 | 2/1950 | Miles | 227—8 |
| 2,703,419 | 3/1955 | Barth | 10—140 |
| 3,066,303 | 12/1962 | Koff et al. | 227—10 |
| 3,131,407 | 5/1964 | Roberts | 10—140 |

FOREIGN PATENTS

| | | | |
|---|---|---|---|
| 366,297 | 12/1938 | Italy | 10—140 |

RICHARD J. HERBST, Primary Examiner

E. M. COMBS, Assistant Examiner